United States Patent
Ramanathan et al.

(10) Patent No.: US 7,788,328 B2
(45) Date of Patent: Aug. 31, 2010

(54) CROSS-FOREST SHARING

(75) Inventors: Rajesh Ramanathan, Redmond, WA (US); Daniel P. Costenaro, Redmond, WA (US); Erik R. Ashby, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 11/270,955

(22) Filed: Nov. 10, 2005

(65) Prior Publication Data

US 2007/0106733 A1 May 10, 2007

(51) Int. Cl.
*G06F 15/16* (2006.01)
(52) U.S. Cl. ............................ 709/206; 709/204
(58) Field of Classification Search ............... 709/204, 709/206
See application file for complete search history.

(56) References Cited

U.S. PATENT DOCUMENTS

| | | | |
|---|---|---|---|
| 6,826,695 B1 | 11/2004 | House et al. | 713/201 |
| 2002/0087670 A1* | 7/2002 | Epstein et al. | 709/223 |
| 2003/0023880 A1 | 1/2003 | Edwards et al. | 713/201 |
| 2003/0149781 A1 | 8/2003 | Yared et al. | 709/229 |
| 2003/0233541 A1 | 12/2003 | Fowler et al. | 713/155 |
| 2004/0044648 A1 | 3/2004 | Anfindsen et al. | 707/1 |
| 2004/0204949 A1* | 10/2004 | Shaji et al. | 705/1 |
| 2004/0267890 A1* | 12/2004 | Soulet | 709/206 |
| 2005/0081063 A1 | 4/2005 | Patrick et al. | 713/201 |

FOREIGN PATENT DOCUMENTS

| | | |
|---|---|---|
| GB | 2411253 | 8/2005 |
| WO | WO 2004/006499 | 1/2004 |

OTHER PUBLICATIONS

Omar Droubi et al.; "*Designing a Windows Server 2003 Active Directory*"; Jun. 27, 2003; 3 pgs.
"*Microsoft Windows "TrustBridge" to Enable Organizations to Share User Identifies Across Business Boundaries*"; Jun. 6, 2002; 3 pgs.
Amir Herzberg; "*Access Control Meets Public Key Infrastructure, Or: Assigning Roles to Strangers*"; 13 pgs.

* cited by examiner

*Primary Examiner*—Kenny S Lin
(74) *Attorney, Agent, or Firm*—Merchant & Gould, P.C.

(57) ABSTRACT

Users from one forest can share PIM data with users from another forest by replicating user account information from one forest into the other forest, including SIDs for each user account (referred to herein as a synchronization process). Using this replicated information, the sharing user wishing to share PIM data across a forest boundary can set a permission to allow the cross-forest user to access the PIM data. The sharing user adds the SID of the cross-forest user to the ACL of the sharing user's mailbox. When the cross-forest user wishes to access the PIM data from the sharing user, the cross-forest user's PIM application obtains the mailbox identifier information of the sharing user from the user's forest. With this mailbox information, the cross-forest user's PIM application can then send a request to the sharing user's mailbox server to access the PIM data.

20 Claims, 3 Drawing Sheets

CROSS-FOREST SHARING

BACKGROUND

Some software systems define a security boundary for users in the system, referred to herein as a forest. The forest may include one or more directory servers, one or more mailbox servers, and one or more client computing devices running personal information manager (PIM) applications. The mailbox server(s) may maintain mailboxes for user accounts, which may have associated PIM data that can be shared with other users having accounts in the forest. However, forests typically have one or more security features that prevent users from one forest from sharing/accessing PIM data with users of another forest. Although some conventional systems are discussed, this background is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, users from one forest can share PIM data with users from another forest by replicating user account information from one forest into the other forest, including security identifiers for users (SIDs) for each user account (referred to herein as a synchronization process). Using this replicated information, a user of one forest (i.e., the sharing user) wishing to share PIM data across a forest boundary can set a permission to allow a user of the other forest (i.e., the cross-forest user) to access the PIM data. In one implementation, the sharing user does this by adding the SID (note, the acronym SID is used herein generically as a security identifier and not just for the Security Identifiers used by Microsoft Windows Security) of the cross-forest user to the access control list (ACL) of the sharing user's mailbox.

When the cross-forest user wishes to access the PIM data from the sharing user, the cross-forest user's PIM application obtains the mailbox identifier information of the sharing user from the user's forest (e.g., from an autodiscovery module residing in the sharing user's forest). With this mailbox information, the cross-forest user's PIM application can then send a request to the sharing user's mailbox server to access the PIM data.

In another aspect, the cross-forest user's PIM application obtains the mailbox identifier information by first obtaining identifier information for an autodiscovery module residing in the sharing user's forest. In one implementation, this referral information is obtained from an autodiscovery module residing in the cross-forest user's forest. The autodiscovery modules of both forests obtain the referral information from information generated during the aforementioned synchronization operation.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary System with Cross Forest Sharing

Figure 1:
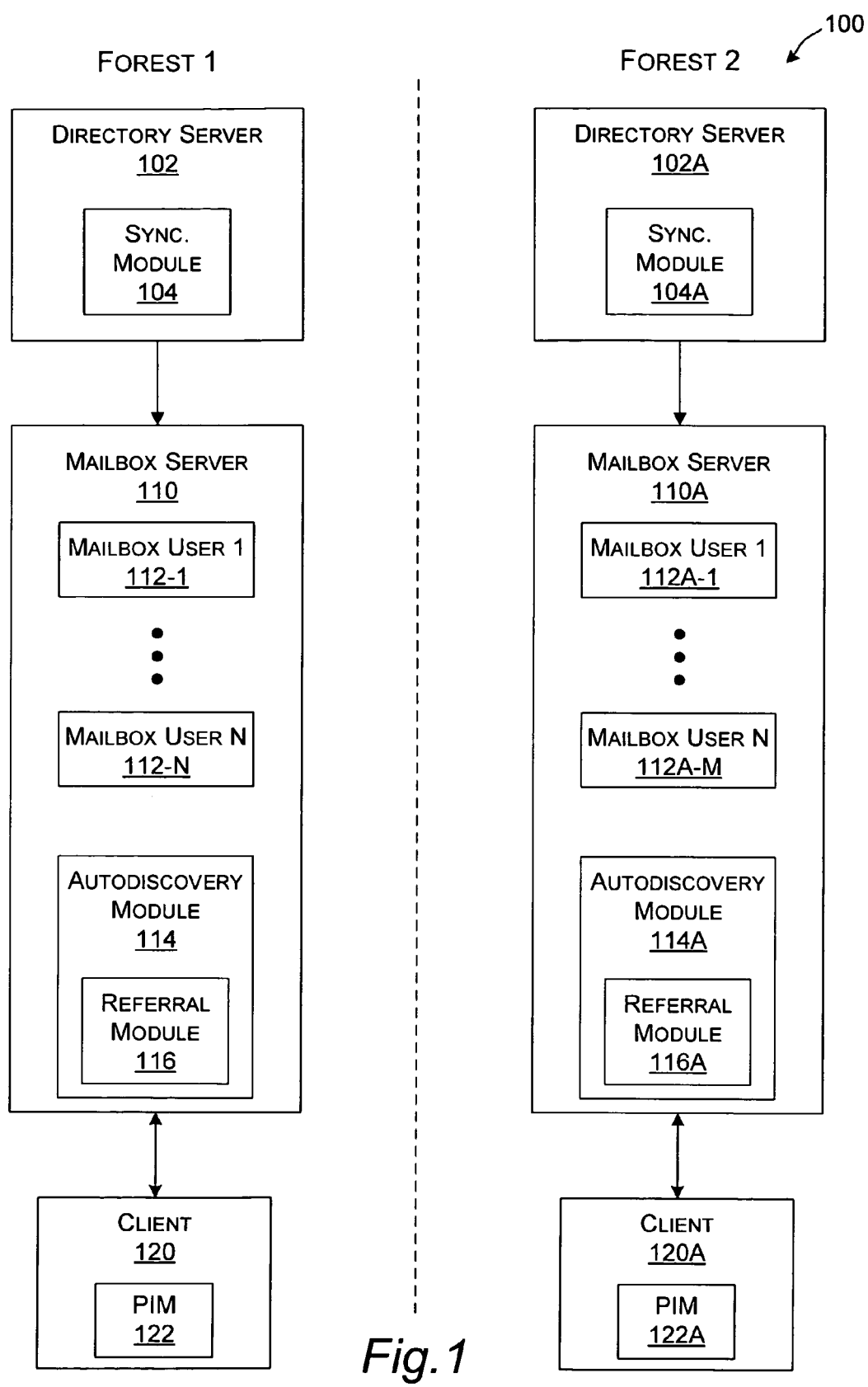
FIG. 1 is a block diagram representing an exemplary system that supports cross forest sharing, according to an embodiment.

FIG. 1 illustrates an exemplary system 100 that supports cross forest sharing, according to an embodiment. In this exemplary embodiment, the system 100 has two forests, although in other embodiments there may be more than two forests. The system 100, in this embodiment, has a Forest 1 that includes a directory server 102 (also referred to as a domain controller in some embodiments) having a directory/SID synchronization module 104; a mailbox server 110 having mailboxes for N users (namely a mailbox 112-1 through a mailbox 112-N) and an autodiscovery module 114 with a referral module 116; and one or more clients 120 each having a PIM 122. The system 100 also has a Forest 2 that includes a directory server 102A (also referred to as a domain controller in some embodiments) having a directory/SID synchronization module 104A; a mailbox server 110A having mailboxes for N users (namely a mailbox 112A-1 through a mailbox 112A-M), and an autodiscovery module 114A with a referral module 116A; and one or more clients 120A each having a PIM 122A.

In this embodiment, the directory servers 102 and 102A have the functionality of conventional directory servers (e.g., implemented with Active Directory® available from Microsoft Corporation, Redmond, Wash.). For example, the directory servers 102 and 102A may support a cross-forest trust mechanism such as that provided by Active Directory. This feature can allow the same SID to be used to set access control to resources in one forest to be respected in the other forest to set access control to resources in that forest.

However, in this exemplary embodiment, the directory servers 102 and 102A provide new functionality; namely that provided by the directory/SID synchronization modules (also referred to herein as the sync modules) 104 and 104A. The sync modules 104 and 104A interact to copy or replicate user account information and, in accordance with this embodiment, the SIDs corresponding to the user accounts from one forest to the other forest. In one embodiment, the directory servers each identify the user accounts from the other forest as contacts (as opposed to normal users of that directory server's forest).

In the mailbox server 110, each of the mailboxes 112-1 through 112-N is used to associate PIM data such as calendar data, e-mail data, contact data, etc. for a corresponding user account of the Forest 1. Similarly, in the mailbox server 110A, each of the mailboxes 112A-1 through 112A-M is used to associate PIM data for a corresponding user account of the Forest 2. In this embodiment, PIM data associated with a mailbox may be shared with other user accounts within the same forest. However, as will be described below, in accordance with various embodiments, PIM data from a mailbox of one forest can be shared with a user account of another forest. In one embodiment, the PIM data is generated using a PIM application such as Outlook&, available from Microsoft Corporation.

The autodiscovery module 114 is a module that allows a PIM application (when newly installed or re-installed) to configure itself with minimal user input (as compared to "manual" configuration that was required by older PIM applications). In one embodiment, the autodiscovery module 114 is implemented with the functionality provided by the auto-discovery service of Exchange Server®, available from Microsoft Corporation. However, in accordance with this embodiment, the autodiscovery module 114 also includes the functionality provided by the referral module 116.

In some embodiments, the autodiscovery module 114 is merged into the directory server 102, eliminating the need for a separate auto-discovery service.

The referral module 116 handles requests for mailbox identifier information of mailboxes that are not maintained by the mailbox server 110 of the Forest 1 (for example, the PIM application 122 can send a request to the autodiscovery module 114 for mailbox identifier information of a mailbox maintained by the mailbox server 110 of the Forest 2). In one embodiment, if the autodiscovery module 114 cannot find the requested mailbox identifier information within the mailbox server 110, the referral module 116 determines from the request whether the requested mailbox resides in a forest for which the sync module 104 has synchronized directories and user account SIDs. For example, in one embodiment, the referral module 116 can inspect the request and determine the domain of the requested mailbox identifier information. This domain information can be used to determine the other forest in which the mailbox resides and whether a directory/SID sync process has been performed with that other forest. If the sync module 104 has synced with that other forest, the referral module 116 can then respond with an address or identifier of an autodiscovery module in that other forest. The PIM application 122 can then request the mailbox identifier information from the autodiscovery module in that other forest.

In this embodiment, the autodiscovery and referral modules 114A and 116A operate in substantially the same manner as the autodiscovery and referral modules 114 and 116 described above.

An example of how PIM data can be shared across a forest boundary in the system 100 is described next. In this example, the user (also referred to herein as User N) associated with the mailbox 112-N of the Forest 1 wishes to share his calendar with the user (also referred to herein as User AM) associated with the mailbox 112A-M of the Forest 2. Using the PIM application 122, the User N gets the contact data of the User AM from the directory server 102 (available after the sync modules 104 and 104A have synced the Forests 1 and 2). The User N then sets a permission on the mailbox 112-N to allow the User AM to access the calendar data associated with the mailbox 112-N. In response, for example, the mailbox server 110 can obtain the SID of the User AM (from the directory server 102) and add that SID to the access control list (ACL) of the mailbox 112-N. Further, the ACL may indicate that the SID only has permission to access the calendar information (excluding, for example, contact and email data associated with the mailbox).

Then when the User AM uses the PIM application 122A to access the calendar of the User N, the PIM application 122A sends a request to access the calendar (associated with the mailbox 112-N) to the mailbox server 110A. In one embodiment, because the mailbox 112-N resides in the Forest 1, the mailbox server 110A will not be able to find the mailbox 112-N. The PIM application 122A then sends a request to the autodiscovery module 114A to obtain the identifier information of the mailbox 112-N. The referral module 116A of the autodiscovery module 114A responds with the identifier information of the autodiscovery module 114 of the Forest 1. Using this referral information, the PIM application 122A can then get the identifier information of the mailbox 112-N from the autodiscovery module 114. In one embodiment, the identifier information of the mailbox server 110 is also provided (i.e., along with the identifier information of the mailbox 112-N). Using this identifier information, the PIM application 122A sends a request (which includes the SID of the User AM) to the mailbox server 110 to access the calendar data associated with the mailbox 112-N. The mailbox server 110 then compares the SID included in the request with the ACL for the mailbox 112-N. In this scenario, the SID is listed in the ACL, which allows the mailbox server 110 to provide the requested calendar data to the PIM application 122A.

Figure 2:
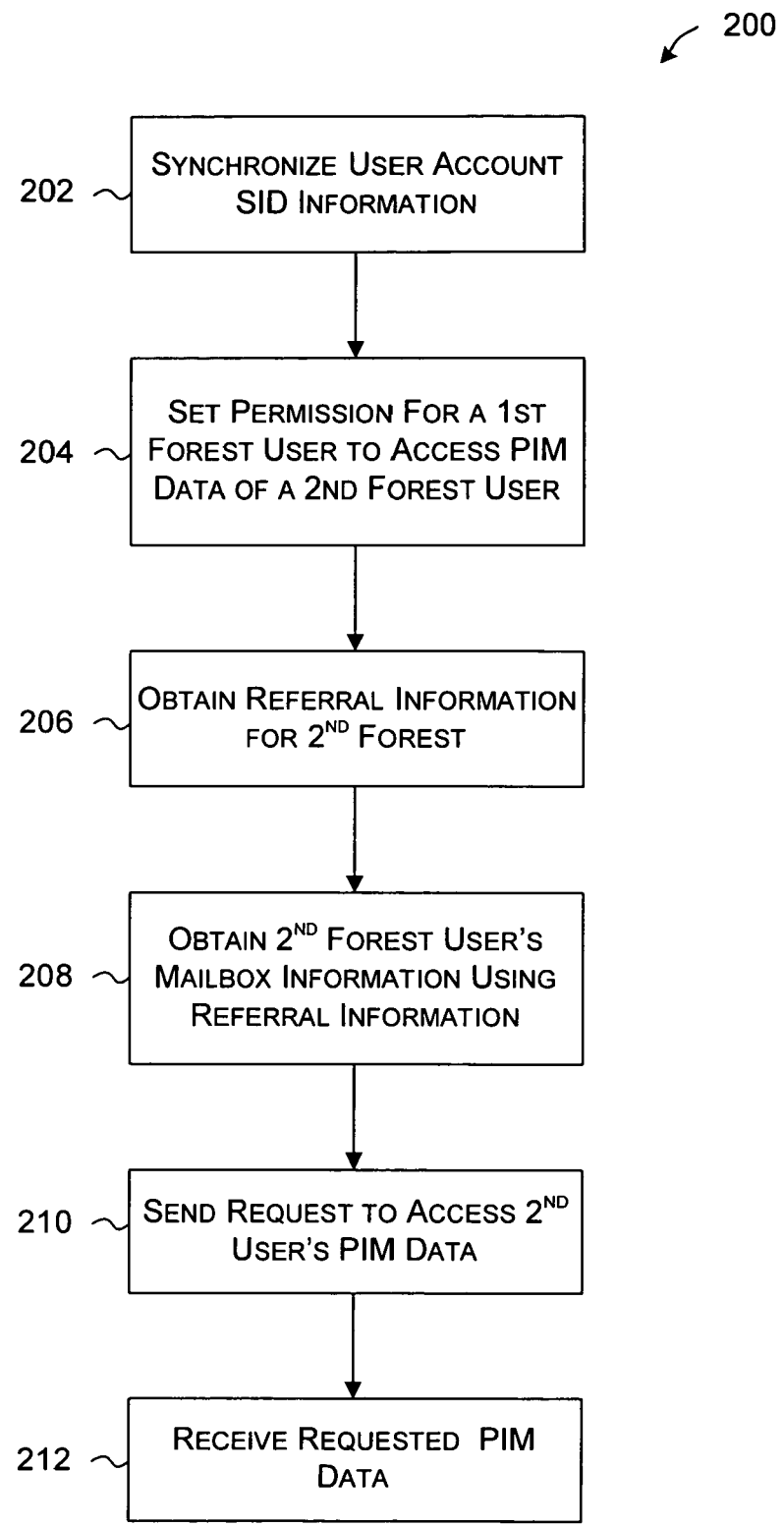
FIG. 2 is a flow diagram representing an exemplary operational flow in sharing PIM data from a user of one forest with a user of another forest, according to an embodiment.

FIG. 2 illustrates an exemplary operational flow 200 in sharing PIM data from a user of one forest with a user of another forest, according to an embodiment. Operational flow 200 may be performed in any suitable computing environment. For example, operational flow 200 may be executed by a system such as system 100 (FIG. 1). Therefore, the description of operational flow 200 may refer to at least one of the components of FIG. 1. However, any such reference to components of FIG. 1 is for descriptive purposes only, and it is to be understood that the implementations of FIG. 1 are a non-limiting environment for operational flow 200.

At a block 202, user account information and corresponding SIDs are synchronized between two forests (there can be more than two forests in other embodiments). In one embodiment, directory servers in each of the forests perform a synchronization process in which user account identifiers from one forest are replicated in the other forest as contacts (instead of users). This process also associates the SIDs of the user accounts to the corresponding contacts. In one embodiment, the directory servers include sync modules such as the sync modules 104 and 104A (FIG. 1).

In one particular embodiment, the two forests use the aforementioned Active Directory® architecture. The administrators of the two forests can then interact to set up a cross-forest trust, as supported by the Active Directory® architecture. The cross-forest trust allows the secure replication of the user accounts in one forest into the other forest using the global access list (GAL) synchronization feature, as supported by the Active Directory® architecture. The GAL sync adds the users from one forest as contacts in the directory server or domain controller of the other forest.

In addition, in accordance with this embodiment, the GAL sync also copies the SID of each user account and associates it with the corresponding contact. This feature is not supported in conventional Active Directory® architectures.

Still further, in accordance with this embodiment, each contact has a property that identifies the type of the contact, which is set to a user type (as opposed to a normal contact type). This property indicates that the contact access a user's PIM data (if given permission by the user), which is prohibited for a normal (i.e., non-user) contact. This property is not supported in conventional Active Directory® architectures.

Still further, in some embodiments, the PIM applications include an address book that can be accessed when the user's device is offline (e.g., without access to the mailbox and/or exchange servers). In these embodiments, the "offline" address book includes information indicating the type of the contact, which will then be available to the PIM application without performing a directory query.

At a block 204, a setting is received for permitting a user (hereinafter referred to as the First User) from one forest (hereinafter referred to as the first forest) to access PIM data of a user (hereinafter referred to as the Second User) in another forest (hereinafter referred to as the second forest). In one embodiment, the Second User uses the PIM application to get the First User's account identifier information (e.g., contact information) from a directory server of the first forest. The Second User can then set a permission for the First User to access the Second User's PIM data (or selected PIM data) in a mailbox server of the second forest. In this embodiment, the mailbox server then obtains the SID for the First User from the directory server and adds the SID to the ACL for the Second User's mailbox.

In this embodiment, the blocks 204 and 206 are substantially performed by components residing in the second forest, with some interaction with a directory server of the first forest during the sync process. The following operations are substantially performed by components of the first forest in response to the First User attempting to access PIM data of the Second User.

At a block 206, cross-forest referral information is obtained in response to the First User attempting to access PIM data of the Second User. In one embodiment, this cross-forest referral information is provided by an autodiscovery module such as the autodiscovery module 114, which includes a referral module such as referral module 116. From the request, the referral module can determine the forest of the Second User's mailbox. The referral module then returns identifier information for the autodiscovery module of the second forest.

For example, in one scenario, using the PIM application (in the first forest), the First User attempts to access PIM data of the Second User. The PIM application sends a request to a mailbox server (in the first forest) to get the Second User's mailbox identifier information. Because the Second User does not reside in the first forest, the mailbox server normally will not be able to return the Second User's mailbox identifier information. Thus, in one embodiment, the mailbox server returns an error message to the PIM application indicating that the Second User cannot be found. The PIM application then sends a request to the autodiscovery module (in the first forest) to get the Second User's mailbox identifier information. In one embodiment, the autodiscovery module searches for the requested information and cannot find it because the Second User resides in the second forest. The autodiscovery module can then determine the forest in which the Second User resides from the request. As previously mentioned, in one embodiment the autodiscovery module includes a referral module that inspects the request and determines the domain of the Second User from the mailbox name and provides identifier information for the autodiscovery module of the second forest. This identifier information of the second forest's autodiscovery module serves as the referral information in this embodiment.

At a block 208, identifier information for the Second User's mailbox is obtained. In one embodiment, the PIM application (of the first forest) sends a request to the autodiscovery module of the second forest using the referral information obtained at the block 206. In this exemplary embodiment, the autodiscovery module of the second forest returns the mailbox identifier information to the PIM application of the first forest.

At a block 210, an access request for the Second User's PIM data is sent to the mailbox server of the second forest. In one embodiment, the PIM application (of the first forest) sends the access request to the mailbox server of the second forest using the mailbox identifier information obtained at the block 208.

At a block 212, the requested PIM data is received. In one embodiment, the mailbox server of the second forest returns the requested PIM data after authenticating that the First User's SID is listed in the ACL for the Second User's mailbox.

Although operational flow 200 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Illustrative Operating Environment

Figure 3:
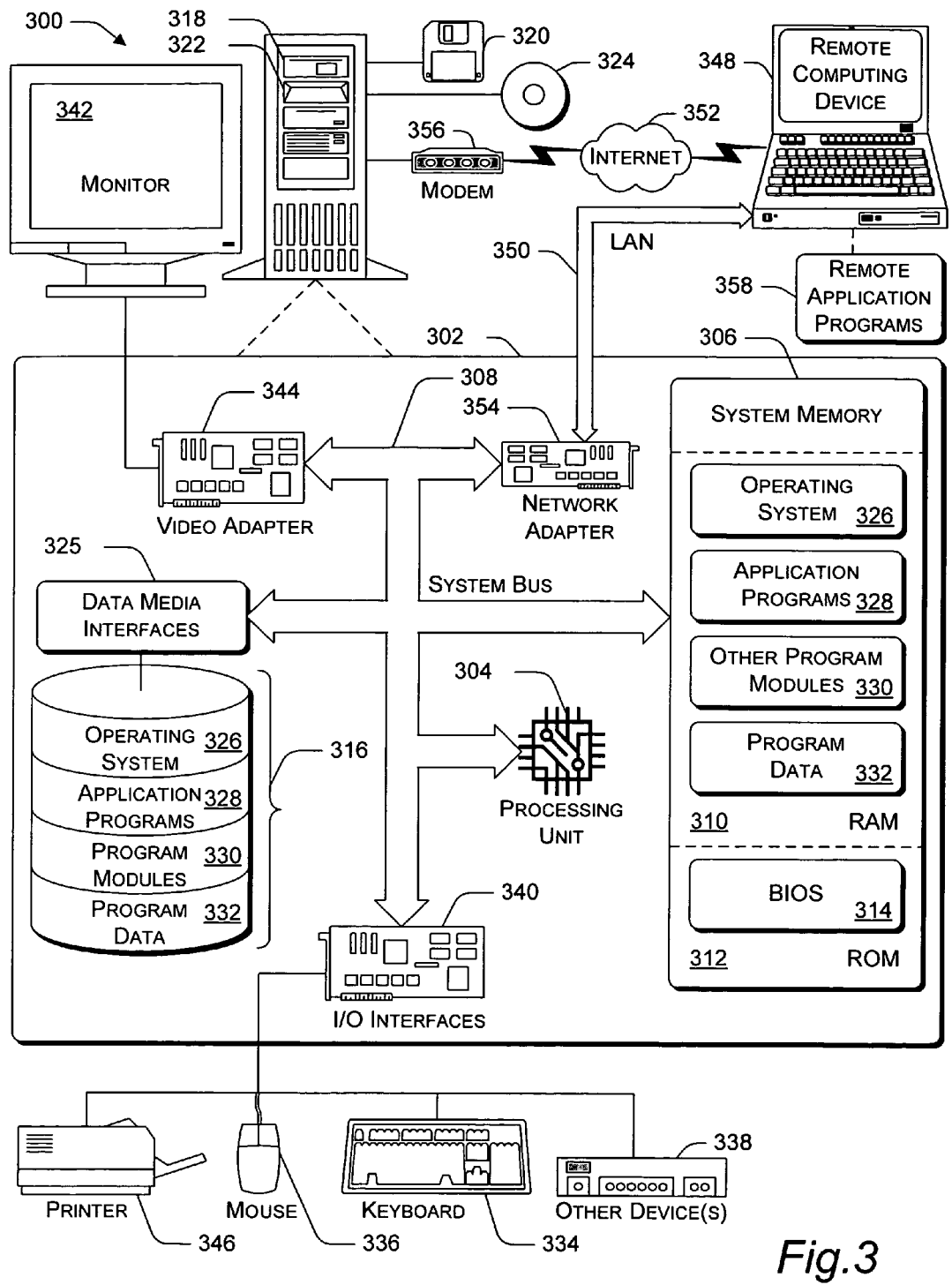
FIG. 3 is a block diagram illustrating a computing environment that may be used according to exemplary embodiments.

FIG. 3 illustrates a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. The components of computer 302 can include, but are not limited to, one or more processors or processing units 304, system memory 306, and system bus 308 that couples various system components including processor 304 to system memory 306.

System bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 302 may include a variety of computer readable media. Such media can be any available media that is accessible by computer 302 and includes both volatile and non-volatile media, removable and non-removable media.

System memory 306 includes computer readable media in the form of volatile memory, such as random access memory (RAM) 310; and/or non-volatile memory, such as read only memory (ROM) 312 or flash RAM. Basic input/output system (BIOS) 314, containing the basic routines that help to transfer information between elements within computer 302, such as during start-up, is stored in ROM 312 or flash RAM. RAM 310 typically contains data and/or program modules that are immediately accessible to and/or presently operated on by processing unit 304.

Computer 302 may also include other removable/non-removable, volatile/non-volatile computer storage media. By way of example, FIG. 3 illustrates hard disk drive 316 for reading from and writing to a non-removable, non-volatile magnetic media (not shown), magnetic disk drive 318 for reading from and writing to removable, non-volatile magnetic disk 320 (e.g., a "floppy disk"), and optical disk drive 322 for reading from and/or writing to a removable, non-volatile optical disk 324 such as a CD-ROM, DVD-ROM, or other optical media. Hard disk drive 316, magnetic disk drive 318, and optical disk drive 322 are each connected to system bus 308 by one or more data media interfaces 325. Alternatively, hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, removable magnetic disk 320, and removable optical disk 324, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 316, magnetic disk 320, optical disk 324, ROM 312, and/or RAM 310, including by way of example, operating system 326 (which in some embodiments include low and high priority I/O file systems and indexing systems described above), one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as keyboard 334 and a pointing device 336 (e.g., a "mouse"). Other input devices 338 (not shown specifically) may include a microphone, joystick, game pad, satellite dish, serial port, scanner, and/or the like. These and other input devices are connected to processing unit 304 via input/output interfaces 340 that are coupled to system bus 308, but may be connected by other interface and bus structures, such as a parallel port, game port, or a universal serial bus (USB).

Monitor 342 or other type of display device can also be connected to the system bus 308 via an interface, such as video adapter 344. In addition to monitor 342, other output peripheral devices can include components such as speakers (not shown) and printer 346 which can be connected to computer 302 via I/O interfaces 340.

Computer 302 can operate in a networked environment using logical connections to one or more remote computers, such as remote computing device 348. By way of example, remote computing device 348 can be a PC, portable computer, a server, a router, a network computer, a peer device or other common network node, and the like. Remote computing device 348 is illustrated as a portable computer that can include many or all of the elements and features described herein relative to computer 302. Alternatively, computer 302 can operate in a non-networked environment as well.

Logical connections between computer 302 and remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, computer 302 is connected to local area network 350 via network interface or adapter 354. When implemented in a WAN networking environment, computer 302 typically includes modem 356 or other means for establishing communications over wide area network 352. Modem 356, which can be internal or external to computer 302, can be connected to system bus 308 via I/O interfaces 340 or other appropriate mechanisms. It is to be appreciated that the illustrated network connections are examples and that other means of establishing at least one communication link between computers 302 and 348 can be employed.

In a networked environment, such as that illustrated with computing environment 300, program modules depicted relative to computer 302, or portions thereof, may be stored in a remote memory storage device. By way of example, remote application programs 358 reside on a memory device of remote computer 348. For purposes of illustration, applications or programs and other executable program components such as the operating system are illustrated herein as discrete blocks, although it is recognized that such programs and components reside at various times in different storage components of computing device 302, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for sharing a user's personal information management (PIM) data with another user across a forest boundary, the method comprising:
   automatically synchronizing user account information between a first directory server that is associated with a first forest and a second directory server that is associated with a second forest; wherein the synchronization includes synchronizing mailbox and security identifier (SID) information for each mailbox between the first directory server and the second directory server; wherein the first directory server identifies user accounts from the second directory server as contacts instead of users of the first directory server and wherein the second directory server identifies user accounts from the first directory server as contacts instead of users of the second directory server;
   obtaining mailbox and security identifier (SID) information for a first user, the first user being part of the first forest;
   setting a permission for the first user in the first forest to access PIM data of a second user, the second user being part of a second forest; wherein the PIM data comprises calendar data and contact data;
   receiving a request at a first mailbox server in the first forest to access PIM data for the second user in the second forest;
   in response to the first mailbox server not locating the PIM data for the second user, providing from the second directory server in the second forest identification information for a mailbox of the second user to a PIM application residing in the first forest in response to a request received from the PIM application in the first forest; and
   providing PIM data obtained from a second mailbox server in the second forest to the PIM application in the first forest in response to a request for PIM data from the PIM application, wherein the request is formed using the provided identification information.

2. The method of claim 1 wherein obtaining mailbox and SID information comprises setting a cross-forest trust.

3. The method of claim 1 wherein obtaining mailbox and SID information comprises setting a type property of the first user's mailbox and SID information to indicate that the first user can access PIM data.

4. The method of claim 1 wherein an autodiscovery module residing in the second forest provides the identification information for the mailbox.

5. The method of claim 4 wherein identification information for the autodiscovery module residing in the second forest is obtained by the PIM application from an autodiscovery module residing in the first forest.

6. The method of claim 1 wherein setting the permission comprises adding the SID of the first user to an access control list (ACL) of the second user's mailbox.

7. The method of claim 6 wherein providing PIM data to the PIM application comprises verifying that the first user's SID is listed in the ACL.

8. One or more computer-readable storage media having stored thereon instructions that when executed by a computer implement the method of claim 1.

9. A system for sharing a user's personal information management (PIM) data with another user across a forest boundary, the system comprising:
   a processor and a computer-readable storage medium;
   means for utilizing the processor and automatically synchronizing user account information between a first directory server that is associated with a first forest and a second directory server that is associated with a second forest; wherein the synchronization includes synchronizing mailbox and security identifier (SID) information between the first directory server and the second directory server; means for obtaining mailbox and security identifier (SID) information for a first user, the first user being part of the first forest;
   means for setting a permission for the first user to access PIM data of a second user, the second user being part of a second forest; wherein the PIM data comprises calendar data and contact data;
   means for receiving a request at a first mailbox server in the first forest to access PIM data for the second user in the second forest;
   in response to the first mailbox server not locating the PIM data for the second user, means for providing from the second directory server in the second forest identification information for a mailbox of the second user to a PIM application residing in the first forest in response to a request received from the PIM application on the first server located in the first forest; and means for providing PIM data to the PIM application in response to a request for PIM data from the PIM application, wherein the request is formed using the provided identification information.

10. The system of claim 9 wherein the means for obtaining mailbox and SID information comprises means for setting a cross-forest trust.

11. The system of claim 9 wherein the means for obtaining mailbox and SID information comprises means for setting a type property of the first user's mailbox and SID information to indicate that the first user can access PIM data.

12. The system of claim 9 wherein the means for providing identification information comprises an autodiscovery module residing in the second forest that provides the identification information for the mailbox.

13. The system of claim 12 wherein identification information for the autodiscovery module residing in the second forest is obtained by the PIM application from an autodiscovery module residing in the first forest.

14. The system of claim 9 wherein the means for setting the permission comprises means for adding the SID of the first user to an access control list (ACL) of the second user's mailbox.

15. The system of claim 14 wherein the means for providing PIM data to the PIM application comprises means for verifying that the first user's SID is listed in the ACL.

16. A system for sharing a user's personal information management data with another user across a forest boundary, the system comprising:

a directory server comprising a processing unit, a computer-readable storage medium, and a synchronization module operating using the processing unit to automatically obtain mailbox and security identifier (SID) information for a first user, the first user being part of a first forest and the directory server residing in a second forest; wherein the synchronization module is configured to synchronize user account information between the directory server that is associated with a first forest and a second directory server that is associated with a second forest; wherein the synchronization includes synchronizing mailbox and security identifier (SID) information for each mailbox between the first directory server and the second directory server;

a mailbox server coupled to the directory server to maintain a mailbox for a second user, wherein a second user can set a permission for the first user to access PIM data associated with the second user's mailbox, the second user being part of a second forest; wherein the PIM data comprises calendar data and contact data; and an autodiscovery module coupled to the directory server to selectively provide identification information for the second user's mailbox to a PIM application residing in the first forest in response to a request received from the PIM application; wherein the identification information for the second user's mailbox is provided after an attempt to locate the second user's mailbox in the first forest.

17. The system of claim 16 wherein the directory server is further to set a type property of the first user's mailbox and SID information to indicate that the first user can access PIM data.

18. The system of claim 16 wherein the autodiscovery module is part of the mailbox server.

19. The system of claim 16 wherein the mailbox server is further to add the SID of the first user to an access control list (ACL) of the second user's mailbox.

20. The system of claim 19 wherein the mailbox server is further to verify that the first user's SID is listed in the ACL before allowing the first user to access PIM data associated with the second user's mailbox.

* * * * *